United States Patent [19]

Parlow

[11] 3,712,581

[45] Jan. 23, 1973

[54] SOLENOID COMBINED SHADING COIL AND RETURN SPRING

[75] Inventor: John Parlow, Arnold, Mo.

[73] Assignee: Emerson Electric Co., St. Louis, Mo.

[22] Filed: Nov. 2, 1970

[21] Appl. No.: 86,020

[52] U.S. Cl. .................... 251/129, 251/141, 335/245
[51] Int. Cl. ........................... F16k 31/06, H01f 7/12
[58] Field of Search ....... 251/141, 129; 335/245, 247

[56] References Cited

UNITED STATES PATENTS

| 2,574,762 | 11/1951 | Schell | 251/141 X |
| 3,283,275 | 11/1966 | Rider, Jr. | 335/245 |
| 2,458,123 | 1/1949 | Wasserlein | 251/76 X |
| 2,998,552 | 8/1961 | Ray | 335/245 X |

Primary Examiner—Arnold Rosenthal
Attorney—Charles E. Markham

[57] ABSTRACT

An a.c. solenoid valve having a magnetic plunger member carrying a valve at one end and a magnetic stop member engaged by the other end of the plunger member when the solenoid is energized to open the valve, the device further including a helical spring of beryllium copper positioned between these members and entered partially into an annular groove in the surface of one of the members, whereby the spring provides conductive turns around a portion of one of the members defined by the groove, thereby to provide a shaded pole portion, and whereby the spring has sufficient resiliency to return the valve to a biased closed position when the solenoid is de-energized.

1 Claim, 3 Drawing Figures

PATENTED JAN 23 1973 3,712,581
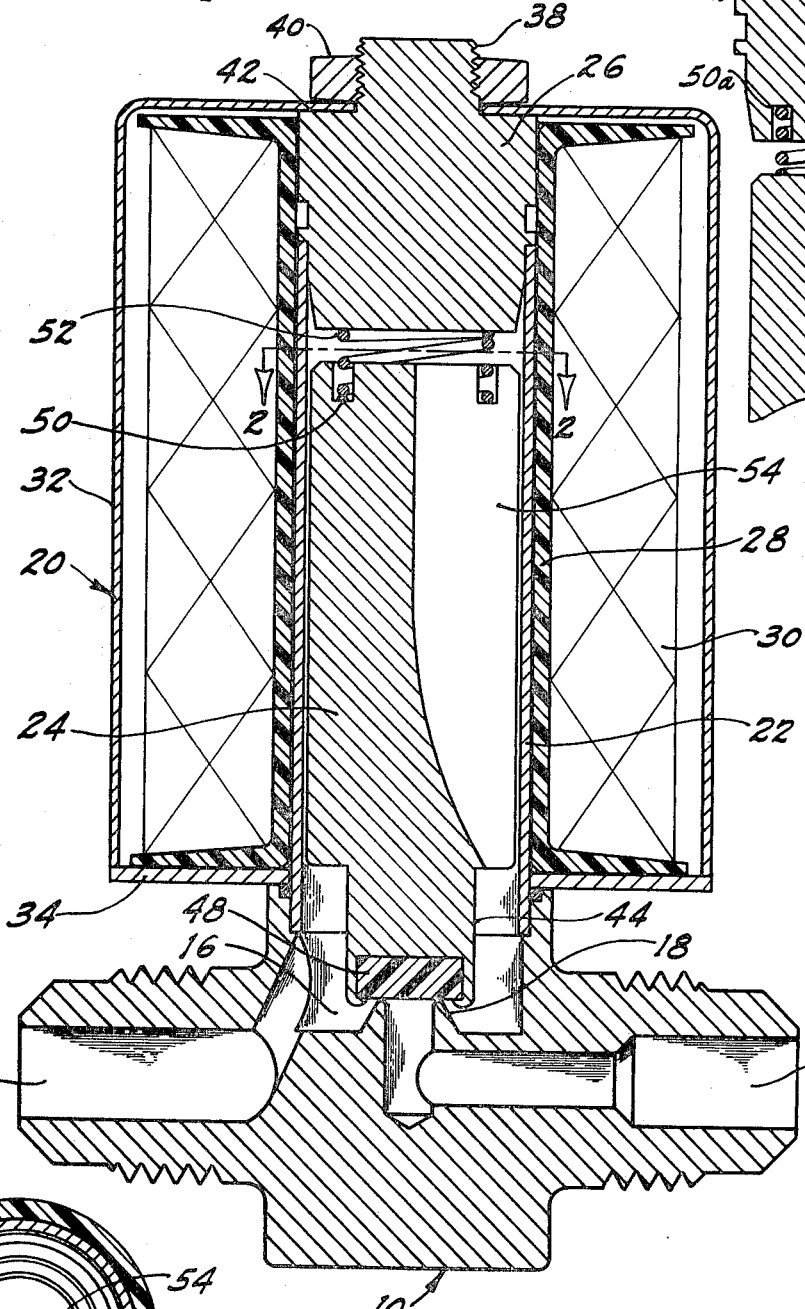
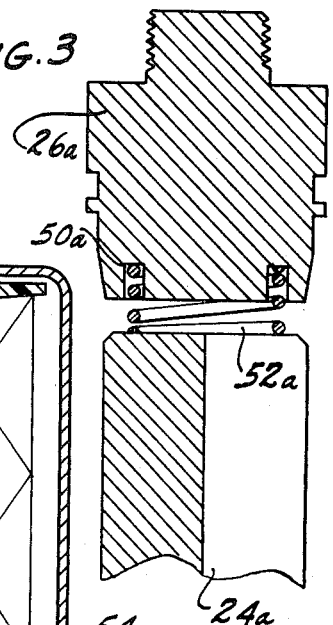
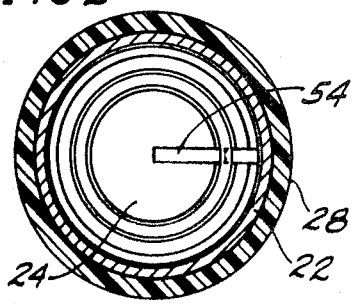
INVENTOR
JOHN PARLOW
BY Charles E. Markham
HIS AGENT

SOLENOID COMBINED SHADING COIL AND RETURN SPRING

This invention relates to a.c. solenoid valves which have a magnetic stop member for limiting the travel of the plunger when the solenoid is energized, a return spring for kicking off the plunger from the stop member, and in some cases biasing the valve closed when the solenoid is de-energized, and means providing a shaded pole portion on the stop member or plunger so as to shift the phase of a portion of the flux passing through these members, thereby to provide a more constant magnetomotive force holding the plunger against the stop member.

Means providing for the "kick-off" of the plunger or the biasing closed of a valve in prior art construction of a.c. solenoid valves has taken many forms. In constructions such as disclosed in the U.S. Pat. Nos. to Wasser 2,650,617 and Garner et al. 2,829,860 for the control of fluid under relatively low pressure with relatively large valves, it is expedient to position the return spring at the lower end of the solenoid. In the more compact constructions having relatively small valves for the control of fluids under relatively high pressure, such as in Wasserlein U.S. Pat. Nos. 2,458,123 or Schell 2,574,762, it is necessary to position the return spring means between the plunger and its stop member.

An object of the present invention is to provide a generally new and improved a.c. solenoid valve having a single annular groove in the meeting surface of either its plunger or stop member and having retained therein a single resilient coil functioning as a shading coil when the solenoid is energized and as a return and biasing spring to close and bias the valve in a closed position when the solenoid is de-energized.

A further object is to provide a solenoid valve having a magnetic plunger member and a magnetic stop member having meeting surfaces, in one of which surfaces an annular groove is formed into which a helical return spring of resilient, non-magnetic, conductive material and of greater free length than the depth of the groove is entered, and which spring is compressed within the groove upon energization of the solenoid to effectively shade the pole portion defined by the groove.

A further object is to provide a solenoid valve as in the preceding paragraph in which the helical spring is constructed of beryllium copper and is of sufficient length and strength to bias a valve carried by the plunger in a closed position when the solenoid is de-energized.

Further objects and advantages will appear from the following description when read in connection with the accompanying drawing.

In the drawing:

FIG. 1 is a longitudinal cross-sectional view of a solenoid valve constructed in accordance with the present invention;

FIG. 2 is a cross-sectional view taken on line 2—2 of FIG. 1; and

FIG. 3 is a fragmentary cross-sectional view showing a modified form of the device shown in FIG. 1.

Referring to FIG. 1 of the drawing, the device comprises a valve body generally indicated at 10, having an inlet 12, an outlet 14, and a valve chamber 16 therebetween in which a valve seat is formed. The device further comprises a solenoid actuator, generally indicated at 20, having a non-magnetic plunger guide sleeve 22, a plunger 24 of magnetic material slidably received in guide sleeve 22, and a stop member 26 of magnetic material fixed in the upper end of guide sleeve 22. The lower end of guide sleeve 22 is entered into the valve chamber 16 and suitably fixed therein in fluid sealing relationship therewith.

Slidably fitted on guide sleeve 22 is a spool 28 of electrical insulating material and a solenoid winding 30 is wound on spool 28. An inverted cup-shaped member 32 and a centrally perforated disc member 34 at the lower open end thereof, both of magnetic material, form a closed casing and complete an external flux path for the solenoid. The stop member 26 is provided with a reduced diameter, threaded stud 38 at its upper end extending through a perforation in the upper closed end of inverted cup member 32. A nut 40 on stud 38 holds the closed upper end of cup member 32 firmly against a shoulder 42 on stop member 26 and holds the lower open end thereof firmly against disc member 34. The central portion of disc 34 is held firmly against the valve body 10.

The plunger 24 has a reduced diameter, lower end portion 44 having an axial recess therein which receives a rubber-like disc valve 48 cooperating with valve seat 18 to control the flow through valve body 10. The plunger 24 is further provided with a coaxial annular groove 50 in the upper end thereof which receives the lower end portion of a helical spring 52 formed of beryllium copper wire. The upper end of spring 52 bears against the lower face of stop member 26. The spring 52 is of such free length and strength as to firmly bias the pliable disc valve 48 on its seat 18 when the solenoid is de-energized, and the depth of groove 50 is such as to permit spring 52 to completely enter therein and to permit the upper end face of plunger 24 to contact the lower face of stop member 26 when the solenoid is energized.

The plunger 24 is provided with a longitudinal slot 54 therein to minimize eddy currents and to provide a passage for the rapid exit of fluid which flows into the space between the meeting surfaces of the plunger and stop member when the solenoid is de-energized.

In operation, when the solenoid winding 30 is in a de-energized condition, the spring 52 is in the extended position shown in FIG. 1 and the valve 48 is biased closed on its seat 18 by spring 52. Upon energization of solenoid winding 30, the plunger 24 is caused to move upward by magnetomotive force into contact with magnetic stop member 26, thereby opening valve 48 and compressing spring 52 within groove 50. A magnetic flux circuit of high permeability now extends through the plunger and stop member and externally through the casing 20, and the plunger 24 is stopped short of centering axially with the axial center of this magnetic circuit so that it bears forcefully against the stop member 26.

However, due to current reversals of an a.c. power supply, the magnetomotive force compressing spring 52 and holding plunger 24 against stop 26 approaches zero twice each cycle. This would result in a rapid, axial, reciprocating movement of the plunger and a chattering thereof against the stop member, due to the action of spring 52, without some means, such as shading a portion of the stop member or plunger, to prevent it.

When plunger 24 engages stop member 26 upon energization of winding 30, the spring 52 provides a plurality of turns around that central portion of the plunger end defined by annular groove 50. The spring 52 being constructed of a conductive, non-magnetic, resilient material, such as beryllium copper alloy, provides the conductance and reactance required to effect the required phase shifting of that portion of the flux passing through the area defined by the groove 50 to preclude axial movement and chattering of the plunger and the resilience required to kick off the plunger and bias the valve 48 closed.

In the modification shown in FIG. 3, a coaxial annular groove 50a is formed in the lower end of stop member 26a instead of in the upper end of plunger 24 in FIG. 1. The operation of the arrangement shown in FIG. 3 is similar to that of the arrangement shown in FIG. 1. Whether the groove and shaded pole are formed in the plunger or in the stop member would be a choice based on considerations of manufacturing or assembling expediency.

I have described the dual-purpose helical spring in the illustrated embodiments of the invention as having sufficient length and strength to firmly bias the valve 48 closed on its seat when the solenoid is de-energized. A spring of this description would ordinarily be required in solenoid valves adapted to control the flow of fluids under relatively high pressure. However, in valves adapted to control the flow of fluids under relatively low pressure, the weight of the plunger may be sufficient to supply the necessary valve closing pressure to effectively cut off flow when the solenoid is de-energized. In these arrangements the dual function spring 48 need only be of sufficient length and strength to overcome any residual magnetism tending to hold the plunger against its stop member when the solenoid is de-energized.

What is claimed is:

1. In an a.c. solenoid valve, a winding, a magnetic plunger member and a magnetic stop member having meeting end faces at one end, an annular groove in the meeting end face of one of said members, a helical return spring formed of beryllium-copper alloy wire having one end portion thereof entered into said groove and bearing at its other end against the end face of the other of said members, a valve body having a seat formed therein, a valve at the other end of said plunger member cooperating with said valve seat, said groove having sufficient depth to receive said entire spring therein and said spring having sufficient resiliency to be compressed therein when said winding is energized to open said valve, the ratio of inductive reactance to resistance of said spring being such as to eliminate objectionable chattering due to current reversals of an a.c. operating power supply by substantially shifting the phase of that portion of the flux passing therethrough, and said spring constituting the sole shading means operative to substantially eliminate chattering of said plunger against said stop.

* * * * *